G. L. MOORE ET AL

RAIL ANCHOR

June 13, 1933. Re. 18,864

Original Filed Nov. 5, 1927

INVENTORS

George L. Moore and James R. Steele.

BY R. S. C. Dougherty.

ATTORNEY

Reissued June 13, 1933 Re. 18,864

UNITED STATES PATENT OFFICE

GEORGE LOOP MOORE AND JAMES ROBERT STEELE, OF OWEGO, NEW YORK

RAIL ANCHOR

Original No. 1,779,979, dated October 28, 1930, Serial No. 231,278, filed November 5, 1927. Application for reissue filed October 17, 1932. Serial No. 638,228.

Our invention relates to an anchor or anti-creeper device for railroad rails.

The object of our invention is to provide a one-piece self-locking anchor which will grip the rail with great tenacity and prevent the creeping of same.

In its broader aspects, our invention comprises an anchor formed from a single piece of metal, having the proper amount of resiliency, which is bent at each end thereof and adapted to bear with considerable pressure against the fillet at the junction of the web and flange at one side of the rail and against the edge of the flange at the other side of the rail, when the anchor is applied to a rail.

The novel features of our invention will be more fully understood from the following description and claims taken with the accompanying drawing, in which:

Figure 1:
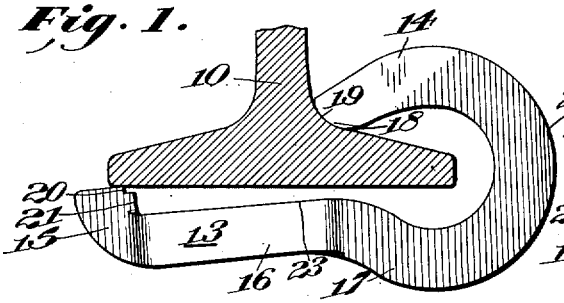
Fig. 1 is a side elevation of the anchor illustrating its initial position when applying it to a rail.

Referring to the drawing: 10 designates a rail supported on a tie plate 11 carried on a tie 12. An anchor, made in accordance with our invention, as shown in the drawing, comprises an under rail portion 13 having an inwardly bent flange overhanging portion 14, and an end upwardly directed toe portion 15. The under rail portion 13 has a substantially straight section 16 which extends from the toe portion 15 to a point substantially midway of its length; the remaining portion of said under rail portion constitutes a downwardly sloping section 17 which continues in a loop upwardly to the flange overhanging portion 14.

The free end of the portion 14 is curved, as at 18, with a radius which is substantially equal to or preferably smaller than the radius of the fillet 19 formed at the junction of the flange and the web of the rail.

The inner vertical face of the toe portion 15 is of stepped formation to provide a plurality of offset faces, preferably two in number, designated by the numerals 20 and 21, respectively, and which are preferably substantially parallel to each other.

In the preferred embodiment of our invention the straight section 16 is somewhat wider than the width of the remainder of the anchor for the purpose hereinafter set forth.

Figure 2:
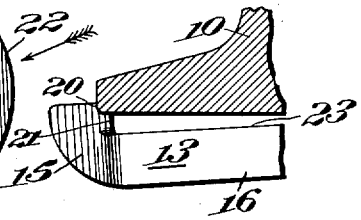
Fig. 2 is an end portion of the anchor illustrating its cooperation with the flange edge of the rail at an intermediate position when applying the anchor to a rail.

Our device is applied to a rail by placing it transversely on the rail to a position adjacent the side of the tie, so that curved end 18 abuts the surface of the fillet 19. The anchor is preferably so proportioned that when it is hung on fillet 19, in its initial position, as shown in Fig. 1, the preponderancy of its weight is at the right hand of the web of the rail, and the shortest distance between the curved surface 18 and the face 20 of the toe portion 15 is less than between the shortest distance between the surface of the fillet 19 and the edge of flange of the rail at the opposite side, and further, the shortest distance between the curved surface 18 and the face 21 is less than the first mentioned distance. It will thus be seen, that, when the anchor is in its initial position it hangs loosely on the fillet 19 and the upper end of the toe portion 15 engages the base of rail, without any appreciable pressure, at a point somewhat short of the contiguous edge of the rail base. When the anchor is struck a sharp blow with a hammer, or other suitable implement, at the point 22, in the direction of the arrow, the metal in the loop portion is sprung and toe portion 15 snaps over the edge of the rail base, the face 20 engaging such edge, as shown in Fig. 2.

Figure 3:
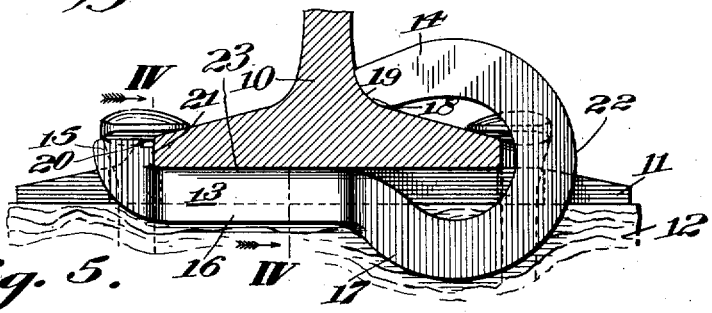
Fig. 3 is a view of the anchor similar to that shown in Fig. 1, except, that it is illustrated in its effective gripping position on a rail.
Figure 5:
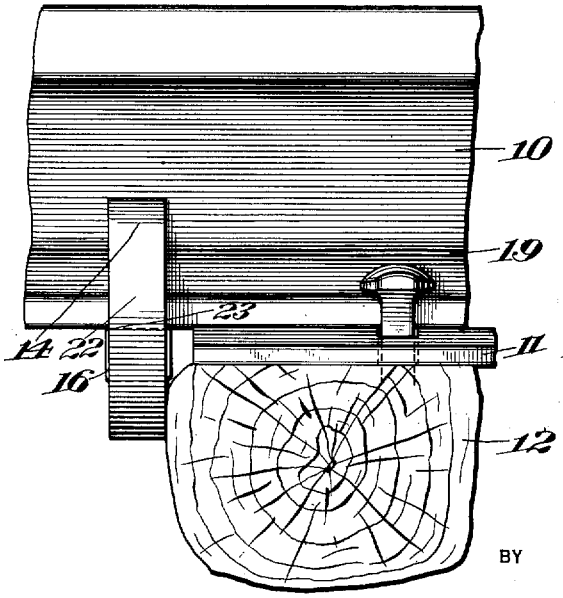
Fig. 5 is an end view of the anchor shown in Fig. 3.
Figure 4:
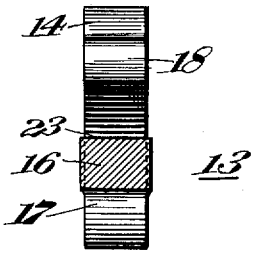
Fig. 4 is a cross section of the anchor taken on the line IV—IV in Fig. 3.

In the latter position the anchor grips the rail and upon a second sharp blow of the hammer, at the point 22, the toe portion snaps further on the rail and the face 21 engages the contiguous edge of the rail, as shown in Fig. 3, and the anchor, thus distorted, securely and effectively grips the rail by virtue of it tending to assume the condition from which it was sprung.

It will be noted that in the position shown in Fig. 3 the shortest distance between the curved surface 18 and the face 21 of the toe portion 15 is greater than in the normal condition of the anchor before being applied to the rail, so that, as the anchor tends to assume its normal condition, its resilient action presses the curved surface 18 against the fillet 19 and the face 21 of the toe portion 15 firmly against the contiguous edge of the rail flange.

In the latter position of the anchor, the upper surface of the straight section 16 is in close contiguity with the base of the rail, but does not normally engage the latter with any appreciable pressure. However, when the rail begins to creep, under service conditions, the under rail portion 13 firmly engages the side face of the stationary tie 12, and the anchor tends to tilt about a horizontal axis. This tilting action greatly increases the gripping action of the anchor on the rail, the edge 23 of the straight section pressing firmly and upwardly against the base of the rail resisted by a downward pressure of the curved surface 18 against the fillet 19 with a resultant increased pressure of the face 21 of the toe portion against the contiguous edge of the base flange of the rail.

By widening the straight section 16 as heretofore mentioned the aforementioned tilting causes a strong pressure to be exerted against the base of the rail without an excessive tilting of the anchor, so it is assured that when the creeping action of the rail discontinues and the rail tends to recede, the anchor is able to easily assume its upright position.

It will be noted, that when our device is applied to a rail, the free end of the portion 14 bears solely on the fillet 19, and as the anchor rotates about this bearing, during its transverse angular movement from its initial gripping position to its final gripping on the rail, said end remains in close contact with said fillet and maintains a strong transverse component pressure against the rail.

When it is so desired the anchor may be conveniently removed from the rail by merely striking the top of the toe portion 15 a sharp blow with a hammer.

It will be seen from the foregoing description that we have devised a simple anchor device which is easily applied to a rail and does not require to be held by the operator during such application. Furthermore, our construction is such that the overhanging portion of the anchor engages solely the fillet at the junction of the flange and the web of the rail, with the result that there is scarcely any localized distortion occasioned, when the anchor is given a transverse angular movement to effect the gripping of the rail, and the stresses thus induced are distributed throughout the length of an anchor, so that a permanent set in the material of the anchor will not occur and it may be removed and replaced many times without losing its efficacy.

While we have shown our invention in but one form, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

Having thus described our invention what we claim as new and desire to secure by Letters Patent is:

1. An anchor having an under rail portion, a portion adapted to engage the fillet at the junction of the web and base flange at one side of a rail, and a portion adapted to engage the edge of the base flange at the other side of said rail, whereby upon forcing the anchor transversely of said rail a strong gripping action is effected on said fillet and said edge of the base flange.

2. An anchor comprising an under rail portion having a substantially straight section and a downwardly sloping section, a rail flange overhanging portion having a loop connection with said under rail portion and its free end curved to engage with the fillet at the junction of the web and base flange of a rail to which the anchor is to be applied, and a toe portion extending from said under rail portion at its end opposite to said rail flange overhanging portion, said fillet engaging portion and toe portion being adapted to grip the rail.

3. An anchor comprising an under rail portion, a rail flange overhanging portion connected to said under rail portion and its free end radiused to engage the fillet at the junction of the web and base flange of a rail to which the anchor is to be applied, and a toe portion extending from said under rail portion at its end opposite to said rail flange overhanging portion, said fillet engaging portion and toe portion being adapted to grip the rail.

4. An anchor comprising an under rail portion, a rail flange overhanging portion connected to said under rail portion and having its free end adapted to engage the fillet at the junction of the web and base flange of a rail to which the anchor is to be adapted, and a toe portion extending from said under rail portion at its end opposite to said rail flange overhanging portion, said toe portion being provided on its inwardly directed face with a plurality of offset faces, said fillet engaging portion and toe portion being adapted to grip the rail.

5. An anchor comprising an under rail portion, a rail flange overhanging portion connected to said under rail portion and having its free end adapted to engage the fillet at the junction of the web and base flange of a rail to which the anchor is to be applied, and a toe portion extending from said under rail portion at its end opposite to said rail flange overhanging portion, said under rail portion having a portion thereof wider than the width of said toe portion or said rail flange overhanging portion, said fillet engaging portion and toe portion being adapted to grip the rail.

6. In a railway track construction the combination with a rail supported on a tie, of an anchor comprising an under rail portion in close proximity to the base of the rail, a flange overhanging portion engaging the fillet at the junction of the web and the base flange at one side of the rail, and a toe portion engaging the base flange at the opposite side of the rail, said fillet engaging portion and toe portion being adapted to grip the rail.

7. An anchor having an under rail portion adapted to engage the base surface of a rail, an inwardly extending portion connected to said under rail portion and engage the fillet at the junction of the web with the base flange of the rail, and a toe portion extending upwardly at the end of said under rail portion opposite to said inwardly extending portion to constitute a vertical shoulder adapted to engage the edge of the base flange of a rail, said fillet engaging portion and toe portion being adapted to grip the rail.

8. An anchor having an under rail portion, a portion connected to said under rail portion adapted to extend over the base flange of the rail to which the anchor is to be applied and engage the fillet at the junction of the web and base flange at one side of said rail, and a member having a surface adapted to engage the edge of the base flange at the opposite side of said rail; the shortest distance between the free end of the second mentioned portion and the base flange engaging surface being less than the shortest distance between said fillet and said edge of the base flange.

9. An anchor having an under rail portion, a portion connected to said under rail portion adapted to extend over the base flange of the rail to which the anchor is to be applied and engage the fillet at the junction of the web and base flange at one side of said rail, and a member having a plurality of surfaces adapted to successively engage the edge of the base flange at the opposite side of said rail when the anchor is applied transversely thereon; the shortest distance between the free end of the second mentioned portion and one of said surfaces being less than the shortest distance between said fillet and said edge of the base flange and the shortest distance between said free end and another of said surfaces being less than the first mentioned distance.

10. In a railway track construction the combination with a rail supported on a tie, of an anchor comprising an under rail portion, a flange overhanging portion engaging the fillet at the junction of the web and base flange at one side of said rail, and a member engaging the edge of the base flange at the opposite side of the rail; said anchor gripping said rail by virtue of its tendency to assume its condition from which it was sprung when applied transversely onto said rail, the transverse pressure of said member against said edge being resisted solely by the pressure of said flange overhanging portion against said fillet.

11. An anchor comprising an under rail portion adapted to engage the base of the rail, an overhanging portion connected to said under rail portion adapted to extend over the base flange of the rail and having its free end adapted to engage the fillet at the junction of the web and base flange of said rail, a member projecting upwardly from said under rail portion having a shoulder so disposed that when the anchor is placed loosely on the rail and said free end engages said fillet, said shoulder is positioned short of the edge of the base flange at the side of the rail opposite to said fillet, but is adapted to engage said edge when the anchor is sprung transversely of the rail.

12. An integral anchor comprising a widened under rail portion adapted to engage the base of the rail, a looped portion adapted to extend over the base flange of the rail and having its free end curved with a radius less than that of the fillet at the junction of the web and the base flange of the rail to which the anchor is to be applied, and a member extending upwardly at the end of said under rail portion provided on its inwardly directed face with a plurality of offset shoulders adapted to engage the edge of the base of said rail; the shortest distance between said free end and one of said shoulders being less than the shortest distance between said free end and another of said shoulders.

13. An integral anchor having an under rail portion adapted to engage the base of the rail, an inwardly extending overhanging portion adapted to bear against the fillet between the web and the base flange of the rail, and a member adapted to engage the vertical edge of the rail on the opposite side to said fillet, whereby upon the application of the anchor transversely of the rail, the anchor is sprung from a normal condition and the transverse pressure of said member against said edge of the rail is resisted solely by the pressure of said overhanging portion against said fillet.

14. An anchor having an under rail portion, a portion adapted to engage the fillet at the junction of the web and base flange at one side of a rail, and a portion adapted to engage the other side of said rail, a part of the anchor being deformable to bring the metal under stress during the placing of the anchor on the rail to effect a gripping action on the rail by said engaging portions.

15. An anchor having an under rail portion, a portion adapted to engage the fillet at the junction of the web and base flange at one side of a rail, and a portion adapted to engage the other side of said rail, whereby upon forcing the anchor transversely of said rail a spring gripping action is effected on said fillet and the opposite side of the rail, a part of the anchor being deformable to bring the metal under stress during the placing of the anchor on the rail to effect a gripping action on the rail by said engaging portions.

16. An anchor having an under rail portion, a rail flange overhanging portion adapted to engage the fillet at the junction of the web and base flange of the rail to which the anchor is to be applied, and means adapted to successively engage the base flange of the rail at the opposite side to said fillet when the anchor is driven transversely onto the rail, a part of the anchor being deformable to bring the metal under stress during the placing of the anchor on the rail to effect a gripping action on the rail by said engaging portions.

17. An anchor having a toe portion adapted to engage one side of the rail, a fillet engaging portion adapted to engage the fillet on the opposite side of the rail, and an intermediate resilient loop portion deformable during placement of the anchor on the rail to effect a gripping action on the rail by said toe and fillet portions.

18. An anchor having a toe portion adapted to engage an edge of one of the flanges of a rail, and a loop portion adapted to embrace the other flange without substantial engagement therewith, said loop terminating in a fillet engaging portion.

19. An anchor having a toe portion adapted to engage an edge of one of the flanges of a rail, a fillet engaging portion adapted to engage the fillet on the opposite side of the rail, and a loop portion embracing the flange on the last mentioned side of the rail but free from gripping engagement therewith, said loop portion being deformable during placement of the anchor on the rail to effect a gripping engagement on the rail between the toe and fillet engaging portions.

20. An anchor comprising end portions adapted to engage opposite sides of a rail, and a loop portion adapted to embrace one of the flanges but be out of contact therewith, said loop portion being deformable during placement of the anchor on the rail to effect a gripping action on opposite sides of the rail by said end portions.

21. An anchor comprising a portion adapted to engage the edge of a base flange on one side of the rail, and a portion adapted to extend transversely of and under the rail flange on the other side of the rail but out of engagement therewith, thence upwardly and then inwardly of this last mentioned flange but still out of engagement therewith, and then terminating in a rail fillet engaging portion.

22. An anchor having a portion adapted to engage one side of a rail and a loop portion adapted to embrace the flange on the other side of the rail without substantial engagement with the top of the flange, said loop terminating in a fillet engaging portion.

23. An anchor having a portion adapted to engage one side of a rail and a portion overhanging the flange on the other side of the rail but out of engagement with the major portion of the upper surface of said flange, said overhanging portion terminating in a fillet engaging portion.

24. An anchor comprising rail engaging portions adapted to engage opposite sides of a rail and a loop portion adapted to embrace one of the flanges but be out of contact with the major portion of the surface thereof, said loop portion being deformable during placement of the anchor on the rail to effect a gripping action on opposite sides of the rail by said rail engaging portions.

25. A rail anchor comprising an under rail portion for bearing against the bottom surface of the rail, a jaw at one end having a surface for bearing against one side of the rail above the upper surface of the flange, and an upwardly projecting jaw at the other end of said under rail portion having a surface adapted to bear against the edge portion of the rail base at the opposite side of the rail, a part of said anchor being deformable to bring the metal under stress during the placing of the anchor on the rail to effect a gripping action on the rail between said surfaces.

26. A rail anchor comprising a bar formed at one end with a jaw for engagement with one edge portion of the rail base flange and formed at the other end with a resilient hook portion adapted to be flexed both vertically and transversely of the rail in application of the anchor to a rail, the extremity of said hook being formed to bear against the rail between the upper surface of the base flange and the under surface of the head and said bar being formed with a bearing against the bottom surface of the rail base.

27. A rail anchor comprising a bar formed at one end with a small jaw for engagement with one edge portion of the rail base flange and formed at the other end with a relatively long resilient hook portion bent to provide clearance between the inner face of the hook and the upper surface of the flange adjacent the edge of the rail base and provided at its extremity with a bearing surface which is forced by the resiliency of the anchor into gripping engagement with the rail between the upper surface of the base flange and the under surface of its head.

28. A rail anchor adapted to be applied to a rail base by driving it transversely of the rail from one side thereof and consisting of a spring metal bar formed at one end with a resilient hook portion which embraces one base flange of the rail and bears at its inner end upon a fillet in the angle formed by the inclined marginal surface of the said flange and the adjacent face of the vertical web of the rail, but remains out of engagement with the other portions of the upper surface and the edge portions of the base flange embraced, and formed at the other end with a locking shoulder for engagement with the longitudinal edge portion of the other base flange; the distance between the end of the hook and said shoulder, when the anchor is free of the rail, being less than the distance between the points engaged by the end of the hook and said shoulder when in applied position, whereby it is necessary to flex the said hook portion to increase the distance between said hook and said shoulder in applying the anchor to its operative position and whereby a spring grip is exerted diagonally through the base from the said fillet to the lower corner portion of said other base flange by the direct reflex action of said hook in tending to return to the position from which it was sprung.

29. A rail anchor for application to a rail by movement transversely of the base to its rail gripping position and consisting of a spring metal bar providing a relatively rigid body portion which extends across beneath the rail base in a position to bear flat against the vertical face of an adjacent cross tie, a resilient hook shaped portion which embraces one base flange of the rail base and provides a jaw which bears upon the fillet in the angle between the upper surface of the base flange and the adjacent face of the web of the rail, but provides a substantial clearance between the said hook and the other portion of the top surface and edge portions of the base flange embraced thereby so as to permit the hook of the anchor to be flexed transversely of the rail, and provided at the other end of the body with a locking shoulder for engagement with the edge surface of the other base flange; the distance between the end of the hook and said shoulder, when the anchor is free of the rail, being less than the distance between the point of the base engaged thereby when the anchor is in operative position, whereby it is necessary in engaging the said shoulder over said base flange to flex the said hook portion toward the adjacent edge of the rail and thereby increase the effective length of said under rail portion.

30. A rail anchor comprising a bar formed with an under rail portion adapted to bear flat against a vertical face of an adjacent cross tie, a bent portion at one end providing a resilient hook which bears at its extremity against a fillet of the rail which serves as a stop surface for the hook end, and provided at the other end with a shoulder adapted to be forced by movement of the under rail portion transversely of the rail relative to the end of the hook, into engagement with the edge of the rail base flange; the said hook being formed by downward and upward bends relative to the under rail portion to provide clearance between the hook and the upper surface and longitudinal corner portions of the adjacent flange embraced thereby, whereby the hook may be flexed toward said adjacent flange to effect said relative movement and whereby the direct reflex of the bend exerts a grip diagonally through the base from said fillet to the lower corner portion of the base flange engaged by said shoulder.

31. A rail anchor comprising a bar formed at one end with a rail base embracing hook to provide a jaw which bears at its inner end upon a fillet in the angle formed by the inclined marginal surface of the base and the adjacent base of the vertical web of the rail, but remains out of engagement with the other portion of the top surface and edge portions of the base flange embraced, formed at the other end with a shoulder for engagement with the lower corner of the rail base at the other side of the rail; the distance between said jaw and shoulder, when the anchor is free of the rail, being less than the distance between the points on the rail base engaged thereby when the anchor is in its applied position, whereby it is necessary to spread the said jaw and shoulder apart to effect engagement of the shoulder with said lower corner portion of the base, and whereby the reflex of the anchor exerts a direct spring grip diagonally through said base from a point on said fillet to the lower corner of the base engaged by said shoulder.

32. A rail anchor comprising a bar extending downwardly from the bottom surface of the rail base to provide clearance between said base and said bar and to provide a tie abutment, and provided with two rail gripping portions, one at each end of the device, one of which bears upon a fillet of the base at one side of the rail and the other of which bears against the lower corner and vertical edge portions of the base at the other side of the rail to effect a spring grip diagonally through the rail.

33. An anchor comprising an under rail portion adapted to engage the base of the rail, an overhanging portion connected to said under rail portion adapted to extend over the base flange of the rail and engage one side of the rail above its base flange when the anchor is placed in its initial position on the rail, and a toe portion projecting upwardly from said under rail portion positioned short of the edge of the base flange on the opposite side of the rail when the anchor is placed in said initial position, said anchor being deformable to bring said toe portion into engagement with the edge of said flange.

34. A resilient device comprising a straight body portion, a toe portion at one end of the body portion, and the other end of said body portion merging into a free ended looped portion formed at its free end to constitute a fillet engaging portion, said fillet engaging portion and toe portion being adapted to grip the structure to which the device is to be applied.

35. A resilient device comprising a body portion, a looped portion connected to said body portion and its free end formed to engage a fillet at the junction of the web and base flange of the structure to which the device is to be applied and a toe portion extending from said body portion at its end opposite to said looped portion, said fillet engaging portion and toe portion being adapted to grip said structure.

36. A device for a railway track structure having edge and fillet portions, comprising a body portion, an end portion to engage a fillet portion at one side of said structure, and an end portion to engage an edge at the other side of said structure, whereby upon forcing the device transversely of said structure into engagement with said fillet and said edge a strong gripping action is effected on the structure.

37. A device for a railway track structure having edge and fillet portions, comprising a body portion, an end portion having its extremity formed to engage a fillet portion at one side of said structure, and an end portion to engage an edge at the other side of said structure, whereby upon forcing the device transversely of said structure into engagement with said fillet and said edge, the device is distorted and causes a strong gripping action on the structure in tending to assume its original condition.

GEORGE LOOP MOORE.
JAMES ROBERT STEELE.